(12) United States Patent
Cheng et al.

(10) Patent No.: US 8,065,712 B1
(45) Date of Patent: Nov. 22, 2011

(54) METHODS AND DEVICES FOR QUALIFYING A CLIENT MACHINE TO ACCESS A NETWORK

(75) Inventors: Wen-Chun Cheng, Milpitas, CA (US); Po-Cheng Wang, Redwood City, CA (US); Venkatapathi Raju Srirajavatchavai, Union City, CA (US); Rajesh Nair, San Carlos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1059 days.

(21) Appl. No.: 11/138,855

(22) Filed: May 25, 2005

Related U.S. Application Data

(60) Provisional application No. 60/653,715, filed on Feb. 16, 2005.

(51) Int. Cl.
 *G06F 7/04* (2006.01)
 *G06F 17/30* (2006.01)
 *G06F 12/14* (2006.01)
 *G06F 17/00* (2006.01)
 *H04L 29/06* (2006.01)

(52) U.S. Cl. .................... 726/1; 726/4; 726/22; 726/29
(58) Field of Classification Search .................. 726/1, 4, 726/22, 29
See application file for complete search history.

(56) References Cited

U.S. PATENT DOCUMENTS

| | | | |
|---|---|---|---|
| 7,162,649 B1 * | 1/2007 | Ide et al. ....................... | 713/165 |
| 7,266,591 B1 | 9/2007 | Johnston | |
| 7,477,894 B1 | 1/2009 | Sinha | |
| 2002/0075844 A1 | 6/2002 | Hagen | |
| 2003/0028803 A1 | 2/2003 | Bunker, V et al. | |
| 2003/0135626 A1 | 7/2003 | Ray et al. | |
| 2004/0047320 A1 | 3/2004 | Eglin | |
| 2004/0064726 A1 * | 4/2004 | Girouard ....................... | 713/201 |
| 2004/0103310 A1 * | 5/2004 | Sobel et al. ................... | 713/201 |
| 2004/0107360 A1 * | 6/2004 | Herrmann et al. ............. | 713/201 |
| 2004/0167984 A1 * | 8/2004 | Herrmann ...................... | 709/229 |
| 2005/0010820 A1 * | 1/2005 | Jacobson ....................... | 713/201 |
| 2005/0018637 A1 | 1/2005 | Karoubalis et al. | |

(Continued)

OTHER PUBLICATIONS

Cisco Systems, Inc., "Cisco Trust Agent1.0," retrieved from the internet at <http://cisco.com/application/pdf/en/us/guest/products/ps5923/c1650/cdccont_0900aecdB011986B>, retrieved on Aug. 25, 2005, 4 pages.

(Continued)

*Primary Examiner* — Michael Simitoski
(74) *Attorney, Agent, or Firm* — Hickman Palermo Truong & Becker LLP

(57) ABSTRACT

Methods and devices for qualifying a client machine to access a network, based on policies governing required protective measures, such as virus checking and operating system updates, are disclosed. A client machine must pass various checks to qualify for access. A client machine may be redirected to remediation resources that support efforts to bring the client machine into compliance with applicable network access requirements. A policy repository is updated regularly by vendors of protective measures. An administrator establishes user roles that are mapped to policy rule sets retrieved from the policy repository. The policy rule sets govern qualification of client machines for access to the network in accordance with the roles of the users of the machines. An access server is an intermediary between a client machine and the access manager. A client agent runs on the client machine and carries out checks, and reports the results via the access server to the access manager.

29 Claims, 4 Drawing Sheets

U.S. PATENT DOCUMENTS

| | | | |
|---|---|---|---|
| 2005/0097199 A1* | 5/2005 | Woodard et al. | 709/223 |
| 2005/0113086 A1 | 5/2005 | Wilson | |
| 2005/0138417 A1* | 6/2005 | McNerney et al. | 713/201 |
| 2005/0228874 A1* | 10/2005 | Edgett et al. | 709/220 |
| 2005/0278775 A1* | 12/2005 | Ross | 726/2 |
| 2006/0002386 A1 | 1/2006 | Yik et al. | |
| 2006/0026686 A1* | 2/2006 | Trueba | 726/24 |
| 2006/0095961 A1* | 5/2006 | Govindarajan et al. | 726/15 |
| 2006/0168653 A1* | 7/2006 | Contrera | 726/9 |
| 2007/0101405 A1* | 5/2007 | Engle et al. | 726/4 |
| 2007/0143824 A1* | 6/2007 | Shahbazi | 726/1 |

OTHER PUBLICATIONS

Cisco Systems, Inc, "Network Admission Control," retrieved from the internet at http://www.cisco.com/application/pdf/en/us/guest/netsol/ns466/c643/cdccont_0900aecd800fdd5B.pdf>, retrieved on Aug. 25, 2005, 2 pages.

Cisco Systems, Inc., "Network Admission Control Phase 1 Requirements, Jun. 2004," retrieved from the internet at <http://www.cisco.com/application/pdf/en/us/guest/netsol/ns466/c664/cdccont_0900aecd80102f1b.pdf>, retrieved on Aug. 25, 2005, 15 pages.

Cisco Systems, Inc., "Release Notes for Network Admission Control, Release 1.0," retrieved from the internet at <http://www.cisco.com/univercd/cc/td/doc/product/vpn/ciscosec/ntadctrl/6276_01.pdf, retrieved on Aug. 25, 2005, 8 pages.

Marguerite Reardon, "Cisco, Microsoft in security showdown," CNET News.com, Sep. 20, 2004, 4 pgs.

* cited by examiner

METHODS AND DEVICES FOR QUALIFYING A CLIENT MACHINE TO ACCESS A NETWORK

PRIORITY CLAIM; RELATED APPLICATION

This application claims domestic priority under 35 U.S.C. §119(e) to U.S. Provisional Pat. App. No. 60/653,715, filed Feb. 16, 2005, which is hereby incorporated by reference in its entirety for all purposes as if fully set forth herein. This application is related to U.S. patent application Ser. No. 10/966,818, by inventors Wen-chun Cheng, Po-cheng Wang, and Rajesh Nair, entitled "Methods and Devices to Support Mobility of a Client Across VLANs and Subnets While Preserving the Client's Assigned IP Address", filed on 15 Oct. 2004. The related application is hereby incorporated by reference in its entirety for all purposes as if fully set forth herein.

FIELD OF THE INVENTION

The present invention generally relates to computer network management. The invention relates more specifically to method and device for qualifying a client machine to access a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Damage to information systems by viruses, worms and other malicious code is one of the biggest challenges in network and system security. The threats continue to grow both in terms of frequency and degree of potential damage.

Furthermore, the extended reach of networks across campuses, into meeting places, coffee houses, hotels, airports and elsewhere has encouraged development of IP-based devices, such as voice over IP (VOIP) telephones and, particularly, wireless IP (Internet Protocol) devices, such as IEEE 802.11 conforming and Bluetooth VOIP (Voice-Over-IP) telephones and PDAs (Personal Data Assistants). Connection of mobile devices to networks presents even greater challenges for protecting networks, as the growth in access points has resulted in an increase in points of vulnerability in the network, and has allowed viruses to spread at ever faster rates.

The old paradigm for many businesses was to standardize desktop machines because standard configurations are easier for an Information Technology (IT) department to maintain, and desktops tend to be less expensive than equally powerful portables. However, users today tend to customize their machines, and may install software over which IT loses control. Mobile devices attach to networks over which IT has no control. It is much more challenging to protect a network against software that is loaded and active when a mobile device gains access to the network than to protect a desktop from accidentally downloading a virus over controlled network channels.

One approach to protecting a network has been to enforce the presence of a particular virus checker on machines seeking Internet access through controlled network channels. For instance, SonicWALL™ firewalls can be configured to enforce installation of an edition of McAfee's virus checking software. However, the firewall's enforcement mechanism is limited to blocking Internet access, as firewalls are conceptually placed on the perimeter of a network, facing the Internet. A firewall can block the spread of viruses between different networks, but not within the network itself. The firewall's checking mechanism is only invoked when a user attempts to reach the Internet through the firewall, and it only checks for an active virus scanning program. A mobile device that joins the network will have free access to core network resources without necessarily invoking the firewall's checking mechanism.

Another approach has been to implement Patch Management Systems that prevent and cure viruses and worms by patching the software. However, many patches when implemented have unintended consequences, such as introducing new glitches into the software. Therefore, even when a patch is available, actual patching is frequently only performed after testing on a parallel system. Furthermore, when a network system is already compromised, automated patch updating may not work. Significantly, patch management systems also regularly rely on users to comply with instructions to download and install a patch. However, users frequently ignore pop-up windows or other messages that indicate that patches and updates are recommended, and do not install the patch.

Complicating the issue, many network environments provide different users with access to different resources depending on who the user is. In particular, many networks are configured to allow guests, such as consultants or contractors, to have at least limited access to network recourses. Visitors gaining access to a network are especially likely to introduce problems into a network, as enterprise IT departments have no control over these users or the devices they use.

Based on the foregoing, known techniques for managing the security of IP connected devices and software are inadequate, especially for mobile users that remotely access a network, and there is a need for alternative techniques for protecting a network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
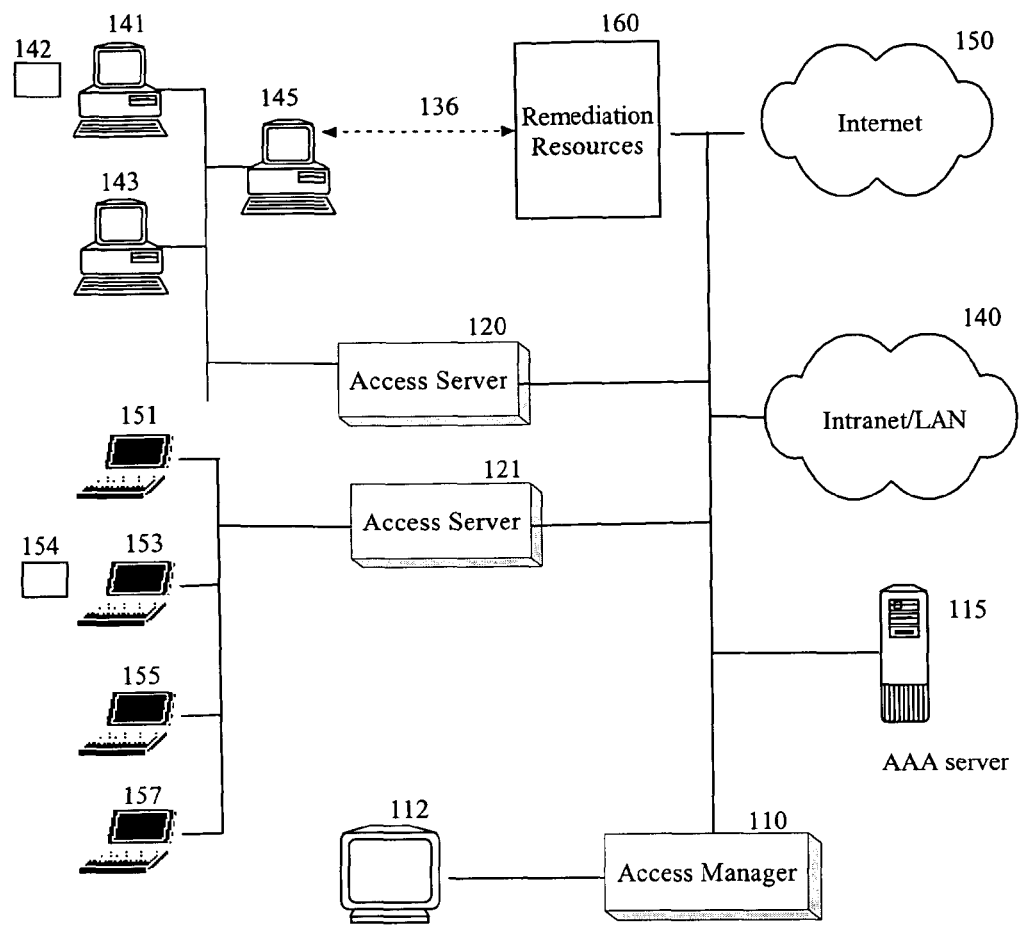
FIG. 1 is a high level diagram of one embodiment of a system for qualifying a client to access a network.

A method and apparatus for qualifying a client machine to access a network is described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Qualifying a Client to Access a Network |
| | 3.1   Policy Server and Policy Rule Sets |
| | 3.2   User Roles |
| | 3.3   Qualification Techniques |
| 4.0 | Implementation Mechanisms - Hardware Overview |
| 5.0 | Extensions and Alternatives |

1.0 General Overview

The present invention relates to methods and devices for qualifying a client machine to access a network, based on policies governing required virus checking, operating system updates, worm, adware and/or malware protections.

The approaches disclosed herein extend network security to every node and entry point on a network. Users are recognized through authentication and authorization, and vulnerabilities of user devices are assessed according to configured security policies. Significantly, devices are assessed before the user gains access to network resources. To enforce enterprise-wide security policies, any devices that are determined to be infected or vulnerable may be quarantined, and/or may be redirected to remediation resources for repairs before being allowed to access the network. Each of these steps occurs before or upon authentication in order to prevent infected machines from ever accessing the enterprise network. By identifying users at the true "edge" of the network, and by taking compliance out of users' control and into the control of IT, overall network security is increased.

The techniques disclosed herein integrate with an enterprise's existing authentication authority to apply role-based policy enforcement upon login to the enterprise network. Role-based policy enforcement allows access to be restricted to only applications and resources determined to be necessary to the role of the user. A web-based administrator console is used to define role-based security policies for various classes of users, from guest users, such as contractors, to system administrators, or executives of a company. For example, roles may be established such that only users with sufficient "executive" privileges, such as a Chief Financial Officer, or other executives, are allowed to access confidential financial databases. As another example, a "guest" role may be established that allows a contractor or other guest access to only public information. Based on user identifier, MAC (Media Access Control) address and IP (Internet Protocol) address, the user's role and associated privileges are tied to the specific device used to access the network.

By default, security policies are enforced when a user first attempts to access the network through application of qualification procedures. Preferably, the user's role determines the qualification procedures and associated standards of adequate protection for meeting network access requirements based on the application of the qualification procedures that are applied. Many different types of qualification procedures can be used to assess a machine's state and vulnerability. One type of qualification procedure is a network-based test, such as a web-based virus scanning program. For example, using the open-source Nessus software system, a scan of the client machine can be executed by a server. Nessus-based scans can detect a variety of vulnerabilities, such as the presence of P2P (peer-to-peer) file sharing software, viruses, worms, and "backdoors" left open by malicious code.

Another type of qualification procedure is a device-based interrogation test. For this type of test, a client agent program is resident on a user's machine and used to execute the test. For example, the client agent program can scan the machine's registry for the latest virus definition files or operating system vulnerabilities. Network-based probes may not be possible on some machines due to security measures implemented by the client (such as a firewall) and/or its operating system. Device-based interrogation tests used to qualify a client machine may perform checks not possible with network-based scanning, such as detecting spyware, anti-virus software version, dates and/or versions of virus definition files, operating system update version information, etc., on the client machine.

Qualification procedures may include both network-based scans and device-based interrogation through client-resident software, or qualification procedures may include only one type of procedure. Qualification procedures are discussed in more detail hereinafter.

If a client machine is determined to be infected or vulnerable based on the results of the application of qualification procedures, the machine can be isolated, and the user granted only privileges to access "safe" resources until the detected problems are fixed.

"Vulnerable" and "clean" machines may be differentiated before users are allowed access to the network. Upon certification that a machine is "clean", it may be added to a list of devices exempt from qualification procedures, hereinafter termed a "clean list." If a machine is on the clean list, or if the machine is found to be clean, the user is authenticated onto the network and given the appropriate role-based access privileges.

The clean list is especially useful in situations in which a user roams from one VLAN (Virtual Local Area Network) or subnet to another within the network. The user's device does not need to be re-qualified whenever the user moves to a different access point in the network, unless security policies or circumstances indicate otherwise. For instance, a first access server may control a first physical area through which a particular client seeks access to the network. After qualification, access servers controlling other physical areas adjoining the first physical area, or adjacent to the first physical area, can recognize the particular client as already qualified to access the network by using the clean list if the particular client moves from the first physical area to the other physical areas. In addition, clean lists are useful in enterprises in which users can share devices, as a clean list may include a MAC address of a shared device.

The clean list can be flushed by an administrator at any time in order to deny network access to all machines until qualification procedures are executed, even those machines previously scanned and qualified. Administrators can also flush the clean list to automatically deploy required updates and patches to all devices attempting to connect to the network. For example, upon the outbreak of a new virus, the administrator may flush the clean list in order to deny network access to all client machines and automatically deploy required updates and patches to all client machines connecting to the network.

If a machine is determined to be infected or vulnerable to certain viruses, it can be given limited access to remediation resources according to the remediation procedures associated with the user's role. The remediation resources may be on the network, or accessible through the network. In one embodiment, the user is redirect to a website that contains the remediation resources. Limited access control defined by the remediation procedures is adapted to isolate the client from general network resources that would be at risk if non-compliant clients were allowed to access the network without satisfying standards of adequate protection The remediation resources can assist an end user with updating and patching a machine according to policies set by an administrator. Unless the user fixes the problem, the user will not be allowed access to the network. In effect, administrators can also push patches and software updates to end client machines without user intervention, on either a scheduled or event basis, by requiring use of the remediation resources as a condition of network access. Users can no longer ignore patch update messages, and avoid complying with IT policies.

In one embodiment, a policy repository stores "policy rules" specified as combinations of conditions. The policy rules are updated regularly, such that the qualification procedures can check that the latest antivirus version has been installed on a client machine, etc. In one embodiment, the conditions generally include "checks." A check may be a test run by web-based scanning programs and/or a test that can be executed by software resident on a client machine. In this embodiment, the checks in the policy rules are used as the qualification procedures.

Also included on the policy server is remediation procedure information, such as remediation packages, instructions and/or redirection links that can be used to clean, fix or update a client machine such that it will qualify to access the network.

A system administrator interacts with an access manager to establish user roles and select a set of policy rules and remediation procedures retrieved from the policy repository to be associated with the user roles. The access manager governs qualification of client machines for access to the network in accordance with the policy rules associated with the role of the user of the client machine.

A further aspect of the invention is an access server that serves as an intermediary between a client machine and the access manager, and enforces network access based on the qualification determinations made by the access manager. The client agent is another aspect of the invention. The client agent comprises software resident on a client machine and carries out certain checks, as indicated by the rule set, and reports the results via the access server to the access manager. The client agent may also receive automatic updates and patches via the access server. Particular aspects of the present invention are described in the claims, specification and drawings.

2.0 Structural and Functional Overview

The present invention relates to methods and devices for qualifying a client machine to access a network, based on policies defined by an administrator. In particular, when a client machine attempts to connect to a network, it must meet standards of adequate protection by applying various qualification procedures, such as checks performed by client agent software resident on a client machine. A client machine that fails to meet the standards of adequate protection may be redirected to remediation procedures that support efforts to bring the client machine into compliance with applicable policies.

FIG. 1 is a high level diagram of connections between various components involved in qualifying a client machine to access a network according to one embodiment. Multiple client machines 141, 143, 145, 151, 153, 155, 157 are depicted. The term "client machine" as used herein is intended to broadly include any IP-enabled end station device that can access a network, such as a PC, workstation, laptop, PDA, printer, etc.

A client machine 141, 153 may include optional client agent software 142, 154 resident on the client machine. Client agent software 142, 154, is not required, as shown by client machines 143, 145, 151, 155, 157. Not shown are various client resources available on the client machines. In general, client agent software resident on client machines provides local-machine agent-based vulnerability assessment and remediation. Once the client agent is downloaded and installed on a client machine, it can perform registry, process, application and service checks on the client machine. The results of these checks can be used to detect antivirus software installation, status and virus definition states.

The client agent software 142,154 typically runs as a service, or alternatively it could be activated by a client that wants to access the network.

Client machines may have wired or wireless connections to access servers 120, 121. More or fewer access servers may be deployed in any given configuration. Not depicted are common network elements such as hubs, routers or switches and access points between the access servers 120, 121 and the client machines. In addition, one or more firewalls may be present in the network. For example, a firewall may be placed at the perimeter of the Internet 150.

In order to access an internal intranet or LAN 140, the Internet 150, or any other resources available on the network, client machines must first go through access servers 120, 121. Access servers can be deployed at the edge of a network, as shown in FIG. 1, or they may be deployed centrally. For example, in a VLAN-enabled environment, multiple VLANs can be trunked through a single access server.

Significantly, access servers can redirect web-based traffic from client machines. For instance, an access server can redirect a client to a website that contains anti-virus software updates and instructions for installing the updates. Access servers can also execute network-based scans of client machines to assess vulnerabilities. Access servers are used to enforce qualification determinations by exercising control over all packets coming from any client machine to the network.

A credentials authority server, such as AAA (Authentication, Authorization and Accounting) server 115, may be accessed through the access servers 120, 121 in response to an initial client request for access. The AAA server may comprise any server that handles user requests for access, and provides authentication, authorization and accounting services for an enterprise. One standard of communication that may be used by the AAA server is the Remote Authentication Dial-In User Service (RADIUS), although others such as TACACS+, are known to those skilled in the art and can be used. Although an AAA server is specifically shown in FIG. 1, any type of credentials authority that can authenticate and authorize users can be used. In addition, multiple credentials authority servers may be used. In one embodiment, a separate credentials authority server is not used, and the access manager 110 performs the authentication and authorization function.

Access manager 110 acts as a qualification authority. After successful authentication, access manager 110 may respond to a credentialed or authorized client, through an access server 120, 121 with procedures for making a qualification determination. In one embodiment, access manager 110 provides policy rule sets to be applied by the client agent software 142, 154 on client machines that have the client agent software installed.

Access Manager 110 is configured and managed through administrator console 112. Preferably, administrator console 112 is a web-based application, accessible through any browser. For example, the administrator console may be a Secure Sockets Layer (SSL)-enabled browser application.

Remediation resources 160 also are indicated in FIG. 1. A logical path 136 between the client machine 145 and remediation resources 160 indicates limited access to resources that may be provided to a client machine. The user can use the resources to fix detected problems on the client machine in order to meet the required standards of adequate protection. For example, the remediation resources may locally provide one or more up-to-date virus checking options (engine and definitions), or may provide links and limited access to outside resources such as virus checking vendor web sites. In one embodiment, remediation resources include remediation packages that are downloaded to the client agent software resident on client machines for automatic or user click-through execution. Remediation packages may include updated files or patches from anti-virus vendors, operating systems service packs, virus fix tools, etc.

3.0 Qualifying a Client to Access a Network

The access manager 110 directs the qualification of a client machine through policies configured by an administrator. Details of various embodiments of the qualification process are disclosed herein.

3.1 Policy Server and Policy Rule Sets

Figure 2:
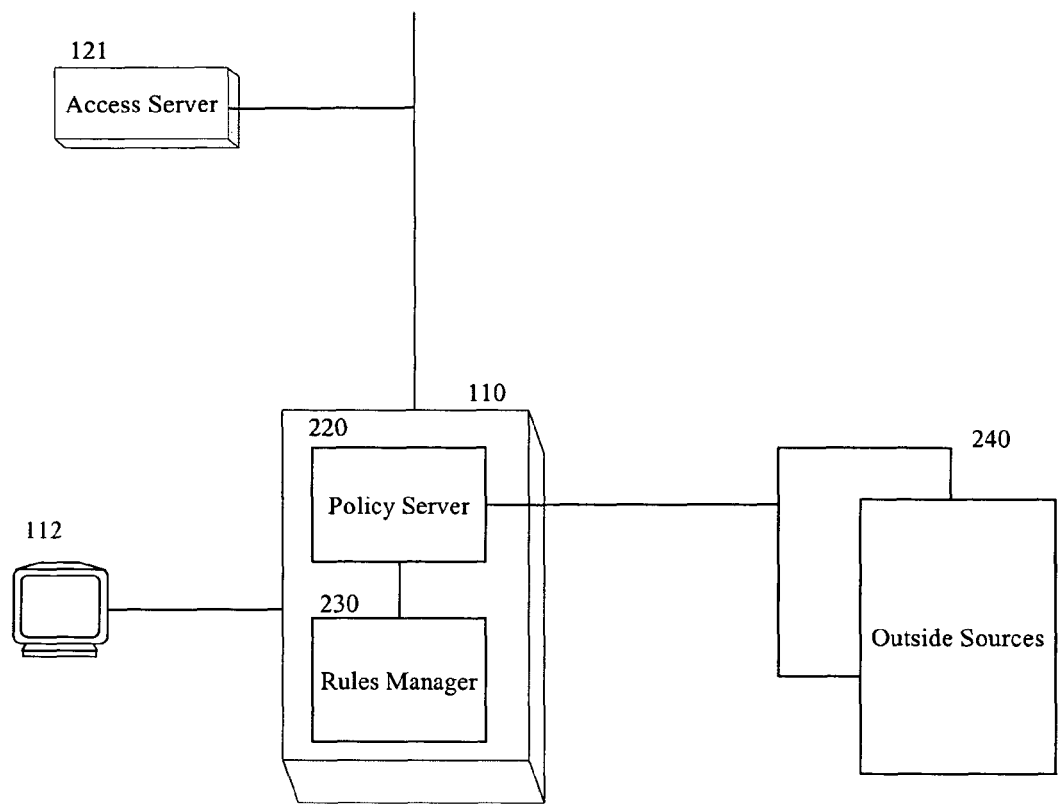
FIG. 2 is a high level diagram illustrating the components of an access manager according to one embodiment.

In one embodiment, the access manager 110 may be comprised of multiple functional components. FIG. 2 illustrates one embodiment of an access manager that includes a policy server 220 and a rules manager 230. Policy server 220 and rules manager 230 may run on separate servers, or separate server clusters, or they may run together on the same server or server cluster. Although only a single rules manager is shown in FIG. 2, a policy server may provide policy rule sets to many rules managers located in many different networks.

In one embodiment, an enterprise manages and configures both the policy server and the rules manager. Alternatively, an enterprise may subscribe to a policy server managed by an outside vendor. Use of an outside vendor and subscription service may be more economical to an organization than implementing a policy server of their own.

More or fewer components may be used to implement an access manager. It should be understood that any of the components may be implemented by clusters or multiple machines on a load balancing basis, without substantially varying the application of embodiments described herein.

As shown in FIG. 2, a policy server 220 connects to at least one outside source 240 to obtain up-to-date information regarding the protective measures that can be expected to apply to clients seeking access to a network. The protective measures may include detecting and removing or immunizing a client machine against undesired programs through anti-virus programs and/or operating systems updates, for example. Outside sources may include antivirus vendors such as McAfee and Norton. These vendors regularly identify current version numbers, release dates, seriousness of threats addressed and similar information for their subscription services. Outside sources also may include operating system vendors, such as Microsoft or Red Hat. These vendors regularly release operating system patches and updates. Other vendors may provide software and subscription services that protect against worms, spyware, malware and adware. Most or all the information needed regarding protective measures can be automatically retrieved by the policy server 220 from the outside sources 240.

The policy server 220 regularly receives up-to-date information from outside sources 240. The policy server may pull the information on a periodic or event driven basis. Optionally, outside sources could notify a policy server of available updates. Alternatively, a system could be configured such that outside sources 240 automatically push updates to the policy server 220 when updates occur, or on a configured periodic basis. Additional outside sources can be added at any time as new protective measures become available.

In some instances, it may be desirable to add supplemental information to information received from outside sources to caution users against overzealous vendors. For instance, if an operating system update were prematurely released and known to cause installation problems, an administrator of the policy server 220 might supplement or override the operating system update information that has been automatically sent to the policy server 220 from an outside source 240.

Information provided by outside sources can be used to construct policy rule sets and remediation procedures. A policy rule set defines the tests that determine whether a client seeking access to the network has implemented particular protective measures. Policy rule sets further set standards for adequacy for the particular protective measures. For example, a rule set may set a standard of adequate protection for anti-virus protection, operating system update installation, worms, spyware, malware and/or adware. As additional protective measures are developed, it is anticipated that one of ordinary skill in the art will recognize how techniques disclosed herein can be adapted to include later developed protective measures. The standards of adequacy in policy rule sets are used to determine whether a client machine should be blocked from accessing the network.

In one embodiment, a policy rule set is a collection of policy rules where each rule can be described as a Boolean expression resulting in a positive/negative outcome upon rule evaluation. Rules are typically defined to determine the posture of the client machine being assessed, including but not limited to, presence or absence of certain software, the runtime status of certain software, or whether a software module is up-to-date.

A policy rule set may include rules for interrogating a device attempting to access the network through optional client agent software resident on client machines. These policy rules may contain Boolean expressions of individual checks. Checks are atomic posture evaluation elements typically implemented through registry checks (presence/absence of registry keys, values of keys, etc.), file attribute checks, application status checks, service status checks, etc. Checks are combined using Boolean operators (including but not limited to AND, OR, NOT, EQUALS, LATER THAN, NEWER THAN, CONTAINS, SUBSTRING OF, EXISTS, DOES NOT EXIST, IS DEFAULT VALUE, etc.) to form a policy rule.

A set of rules can then be created by combining rules using simple or complex logic. Examples of logic used to combine rules into rule sets include "All rules must be satisfied", "None of the rules must be satisfied", "One of the rules must be satisfied", etc. A policy rule set thus defines the one or more qualification procedures and standards of adequate protection that determine whether a client seeking access to the network has implemented particular protective measures.

Rule sets may be constructed to provide different levels of network access requirements by including rules that have different qualification procedures, and/or including rules that have different standards of adequate protection. For instance, for virus checking, policy server 220 may contact multiple vendors (outside sources 240) for current engine and virus checking versions. In addition, the policy server 220 may obtain qualitative information from the virus checking vendors regarding the significance (e.g., high, medium or low) of versions of various protective measures, and use that qualitative information to establish different standards of adequate protection for different policy rule sets. For example, a rule specifying that all medium and high level virus-checking version updates must be up-to-date may be established by specifying a particular minimum version level for a particular virus-checking program as a check in a rule. This rule may then be included in a rule set The same approach may apply to vendors of other protective services. The checks may take other forms than checking version numbers, such as registry checks, file attribute checks, and application or service running checks. A registry check for a particular key may test the existence, nonexistence or a value or range of values for particular keys. In this sense, registry may include a Windows-style Registry or a UNIX-style collection of parameter files. A file attribute check may test the existence, size, date stamp, location or version of a particular file. An application or service running check may determine whether an application or service is currently running on the client or an associated device.

In one embodiment, the policy repository also receives from outside sources updated plug-ins that are to be used to perform network-based scans. These plug-ins are distributed to the access servers for the access servers to use when performing the network-based scans.

The rules manager 230 receives policy rule sets from the policy server 220. The policy server may respond to electronic requests for the updated rule sets from the rules managers. Alternatively, the policy server may broadcast the availability of updated rule sets to rule managers. Alternatively, the policy server may respond to subscriptions for updated rule sets by pushing rule sets to subscribing rule managers. A subscription may, optionally, be accompanied by credentials. These credentials may be linked to arrangements for payment for access to updated rule sets.

3.2 User Roles

An administrator uses the rules manager to adopt and apply rule sets for a particular organization or department. Preferably, rule sets are selected and associated with roles, so that the roles can be reused and applied to particular users or user groups. The rule sets associated with a role are used to govern qualification of a client to access a network according the user's role.

In one embodiment an administrator may interact with the rules manager via a command line or graphic user interface through administrator console 112 to select specific rule sets for each role. Alternatively, an automated process may be used in which certain roles may be pre-configured with associated rule sets. The administrator can use the rules manager to create roles, associate rule sets with roles, and assign prospective clients or users to roles.

Role-based access means that different user groups can be subject to various types of qualification procedures and various standards of adequate protection. Role-based access controls network access based on user, device and traffic attributes or characteristics. In addition to security, differentiated services can be provided to various user groups, as each defined role can be mapped to one more security or access policies that define authorization levels for that user or user group. Role-based access allows for highly granular control of user network access.

Different rule sets can be applied to different users or user groups through roles. By differentiating users, appropriate security policies can be applied to high- and low-risk users groups. For example, a "guest" role for visitors can be defined to provide a high-level of security for these users and their devices, while an "IT department" role can be defined for IT personnel that provides for quicker access at a lower-level of security. In this case, the guest role will be mapped to rule sets that enforce a high level of security and the IT role will be mapped to rule sets that enforce a lower level of security.

One role that may be used is a "temporary" role. For example, suppose a rule set associated with a user includes a rule for which the user's client machine does not meet the standards set in the rule. In this case, the user may be put into the temporary role. While in the temporary role, the user is given limited network access to remediation resources that can be downloaded and installed so that the client machine will meet the standards set in the rule set. In one embodiment, a remediation package may be automatically downloaded and installed, or the user may perform a click-through installation of a remediation package. Different temporary roles can be created to map different rule sets to different remediation packages.

The user remains in the temporary role instead of the role that would normally be assigned to him until the remediation procedures are performed. In one embodiment, the temporary role includes a timeout period, wherein if the user does not update his machine to meet the requirements within the timeout period, he must start the access process over. This encourages users to perform measures needed to bring the client machine into compliance immediately.

Another role that may be used is a "quarantine" role. For example, if a client machine is found to be vulnerable through a network-based scan, the user may be given a "quarantine" role. The quarantine role may be configured to block all access to the network, or it be configured to allow limited network access to a remediation resource adapted to enable non-compliant clients to satisfy the standards of adequacy in the rule sets by fixing the detected vulnerabilities. Remediation resources may be resident on the network or may be accessible through the network. Typically, the remediation procedures associated with the quarantine role cause the user to be redirected to a website that contains remediation resources, such as instructions or remediation software. In one embodiment, the user is prevented from a normal login role until the vulnerabilities are fixed. Multiple quarantine roles may be configured if different resources are required to fix various vulnerabilities, or different client machine operating systems. The quarantine role may also have a timeout period associated with it.

The quarantine role ensures that access to the network by a client is substantially limited, wherein the client is isolated from general network resources that would be at risk if a non-compliant client were allowed to access the network without satisfying the rule sets.

Another role that may be defined is that of a "guest" user. This role may be given to unauthenticated users. The guest role may be configured to completely block all network access, or provide very limited access. For example, the guest role may be used to allow very limited access to the network, and may be associated with a rule set that checks for a very high level of security in the user's machine. In one embodiment, the system may be configured such that all "guest" users are blocked from any access to the network.

Administrators can adapt to the ebb and flow of malicious code by adjusting the rule sets required for qualification, the roles subject to rule sets, the use of the clean list and the remediation procedures required when a vulnerability or virus is found.

3.3 Qualification Techniques

Figure 4:
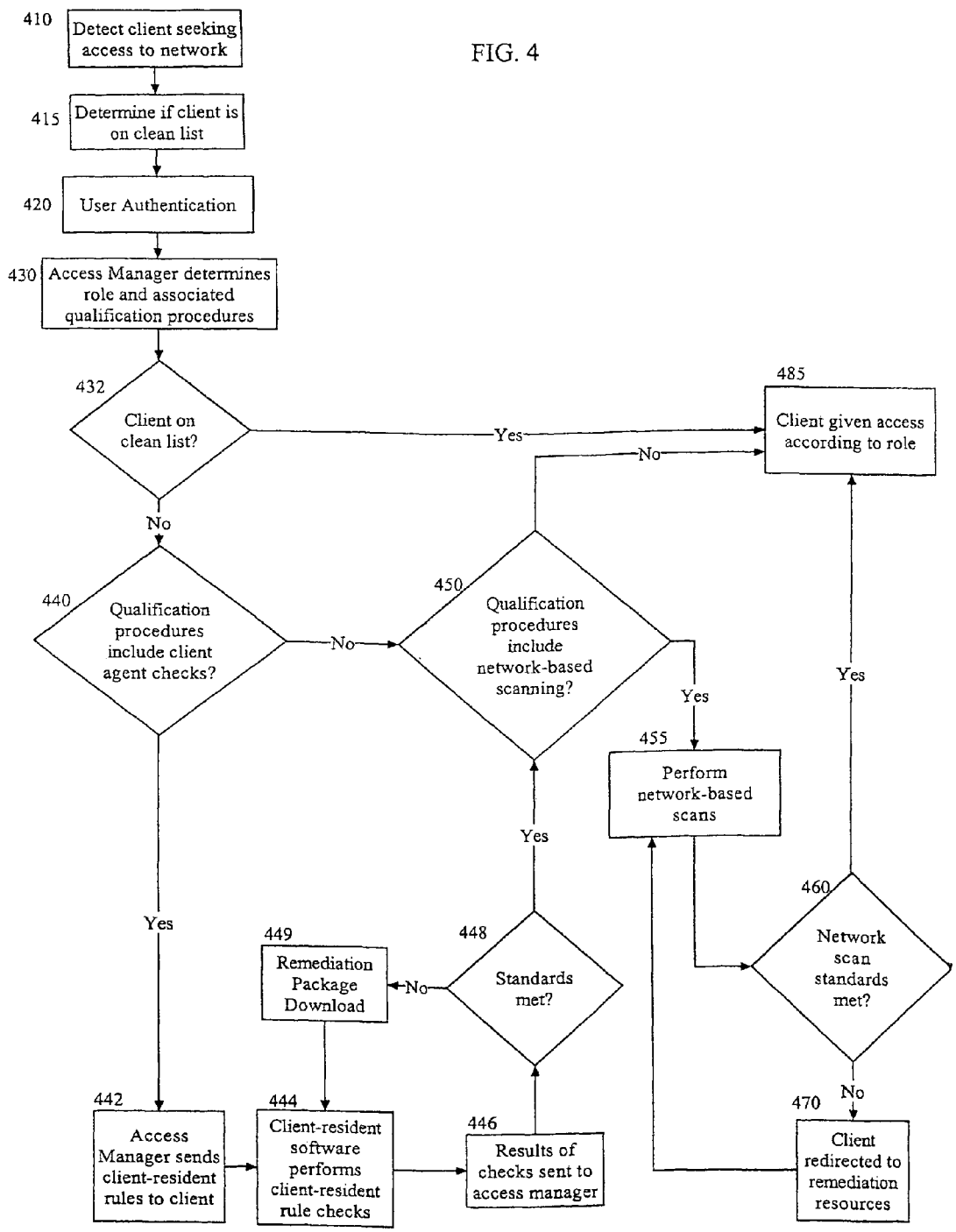
FIG. 4 is a flowchart illustrating an embodiment of a method for qualifying a device to access a network.

FIG. 4 depicts an embodiment of a method to qualify a client to access a network. At step 410, a client attempts to connect to a network. For example, a user may access an access point on a wireless LAN with his laptop computer. Alternatively, client agent software resident on the client machine may detect activity by the client that requires access to network. An access server, such as access server 121, detects that a client is attempting to access the network.

A user may enter user identification information as part of the request for access. For example, a user may enter a user identifier and a password, or use a biometric appliance. A secure web login page, or alternatively the clean agent software resident on client machines, may be used to present a login interface and obtain identification information from the user.

At step 415, information such as user identifier, client machine MAC address or other device identifier may be used to determine whether or not the user's client machine is on the clean list. If the client machine is on the clean list, it is exempt from qualification procedures. In this case, the user is given access to the network according to the user role that is determined in step 430, as shown by steps 432 and 465, discussed below. Although shown in FIG. 4, the use of a clean list is an optional feature, and is not required in all systems that qualify client machines to access a network. If there is no clean list, every client machine attempting to access the network must pass qualification procedures in order to access the network with every session.

At step 420, the access server may forward to a credentials authority 111, either through the access manager 110 or directly, information from the client that identifies the client for authentication purposes. For instance, the username and password provided by the client at step 410 may be forwarded to the credentials authority 115. In one embodiment, step 420 is skipped if it is determined that the client machine is on the clean list at step 415.

At step 430, a role is determined for the user. If the user is authenticated and authorized by the credentials authority, the access manager may then determine a role based on the user's identification, the type of machine the user is using, whether the machine is on the clean list, and optionally even network traffic information. If the client is not authenticated at step 420, the role assigned may be that of a "guest" user.

The role may be determined from a number of attributes. For example, the MAC address of the client machine, the subnet through which access is requested, the IP address of the client machine and the user identifier may all be used to determine a role. In one embodiment, the MAC address is given higher priority then the user identifier, such that if a user's login identifier associates him with "Role B", but the MAC address associates the client with "Role A", "Role A" may be used instead of Role B. Other priorities may be configured.

Typically, the role determined for a user during a user session persists for the duration of the session.

At step 432, if the client was determined to be on the clean list in step 415, the process continues to step 485, where the role determined for the user during step 430 is used to define which network resources are accessible by the user during this session. If the client is not on the clean list, it must be qualified through qualification procedures and standards of adequate protection associated with the determined role, as shown by steps 440-470.

At step 440, if the qualification procedures associated with the determined role include device-based interrogation tests, the process continues to step 442, where the client agent rules are sent to the client agent software resident on the client machine from the access server. The rule sets sent the client machine may be cached on the access server 121, or they may be passed through the access server 121 from access manager 110. In this case, additional rule sets may be downloaded from the access manager to the access server for future use.

For example, a future client that attempts to access the network through the access server may have a different role requiring different rule sets, or the role of the current user may change.

The client agent rules are those that include checks that need to be performed by the software resident on the client machine due to security measures typically implemented by clients or operating systems. The client agent software on the client machine is invoked to perform the checks. In this sense, invoking may mean communicating with, as the resident software may be running as a service and may have identified the client seeking access.

In one embodiment, the role may be configured such that if the client machine does not have the client agent installed, then the client machine is required to have the client agent software installed in order to apply the client agent rules. In this case, the user may be redirected to a website or area on the network that provides instructions and downloadable installation executables. The user must install the client agent on his client machine at this point. In one embodiment, the downloadable installation executable of the client agent is stored on the access server. In one embodiment, a master downloadable installation executable is stored on the access manager, and distributed to the access servers whenever it is updated.

In another embodiment, the role may be configured such that if the client machine does not have the client agent installed, then the client agent rules associated with the role may be skipped, however the user may be informed of the availability of the client agent. The role may later be changed to require the client agent.

At step 444, the client agent applies the checks in the rule sets associated with the user's determined role, and determines whether conditions defined by elements of the rule sets are true or false. For example, the registry can be scanned for the latest virus definition files or for operating system vulnerabilities, according to various checks in the rule sets.

Any results from the checks are forwarded to the access manager via the access server at step 446. The rule sets may not indicate what results of applying the checks will result in qualification to access the network. Reporting the results of the checks may simply include reporting a set of true and false indications. Alternatively, rule sets could fully describe conditions necessary for qualification and the resident client agent software could report the sum evaluation of the checks. These results are evaluated by the access manager to determine whether the checks meet the standards of adequacy set by the rule sets, as indicated by step 448.

If it is determined that the client machine does not meet the established standards, the access manager 121 may notify the user of the determination. In one embodiment, the user is placed in a "temporary" role such that access to the network is limited to the access configured for the temporary role.

The temporary role is preferably configured such that indicated remediation resources may be accessed by the client. However, alternatively, the temporary role could be configured such that the client is not allowed any access to the network, in which case the process ends and the user is required to re-start the qualification determination process again in order to access the network.

The access server may be used to substantially prevent access of the rejected client to the network, pending remediation and successful qualification. The access server may enforce navigation limits, time limits or both on a client pursuing remediation resources according to the temporary role. Access may be controlled by packet filtering. When the client is later qualified to access the network according to his normal user role, the access server will grant access to the user according to the new role.

In the embodiment shown in FIG. 4, one or more remediation packages are then automatically downloaded and installed on the client machine through the client agent at step 449. In alternative embodiments, the remediation packages are manually downloaded by the user. In another alternative embodiment, the user could be redirected to a website that contains remediation procedures, and the user performs remediation procedures instead of downloading a remediation package.

In the specific embodiment shown in FIG. 4, while in the temporary role, the user is required to download and install a remediation package before gaining the access that would be given to him through his normal login role. Alternatively, the user is warned and given the opportunity to download a remediation package, but access is not limited. For example, operating system updates or current virus checking software can be downloaded as a remediation package.

After the remediation package is downloaded and installed, the client agent re-executes the checks at step 444, and sends the new results to the access manager via the access server at step 446. The access manager should find that the client machine meets the standards in step 448, however, if the access manager determines that the client machine is still vulnerable, the loop of steps 449-444-446-448 is repeated. This may occur, for instance, if installation of the remediation package caused a different check to indicate that the client machine is vulnerable, or if the role or set of rules were updated while the client agent was installing the remediation package.

If the qualification procedures do not require the client agent software at step 440, or if the client meets the standards established for the client agent qualification procedures at step 448, the process continues to step 450. If there are any network-based scans included in the qualification procedures, the process continues to step 455, where the access server performs the network-based scans of the client machine. If there are no network-based scans to apply, then the process continues to step 485, where the user is given his normal login role, with its associated privileges.

Results of the network-based scans are sent from the access server to the access manager. At step 460, the access manager determines whether the client machine meets the standards of adequate protection associated with the network-based scans. If the client machine meets these standards, then the client machine has met all standards of adequate protection, and the user is given his normal login role at step 485.

If the access manager determines that vulnerabilities were found based on the results of the network-based scans, the client is placed in a quarantine role and redirected to mediation resources at step 470. In the quarantine role, the user may be given limited privileges to safe sources. For example, the quarantine role may allow a user to access a Post Office Protocol 3 (POP3) server for email.

In one embodiment, when the user is placed in the quarantine role, he is given only access to a website or a network area that contains remediation resources such as fix tools and/or instructions. In one embodiment, the user is automatically redirected to the website. Providing access to remediation resources may include providing links and permitting the client limited access to follow the links and access remediation software.

After any type of qualification procedures are applied, results are sent to the access manager for qualification determination. The access manager instructs one or more access servers 121, 131 regarding the results of qualifying the client for access to the network, including what type of access to enforce. Optionally, results of the qualification process may also be provided by an access server to the client.

Alternatively or in addition, if the client agent software is installed on the client machine, the quarantine role can be configured to cause packages of fix tools and/or executables, such as anti-virus software updates, to be automatically downloaded to the quarantined machine.

4.0 Implementation Mechanisms—Hardware Overview

Figure 3:
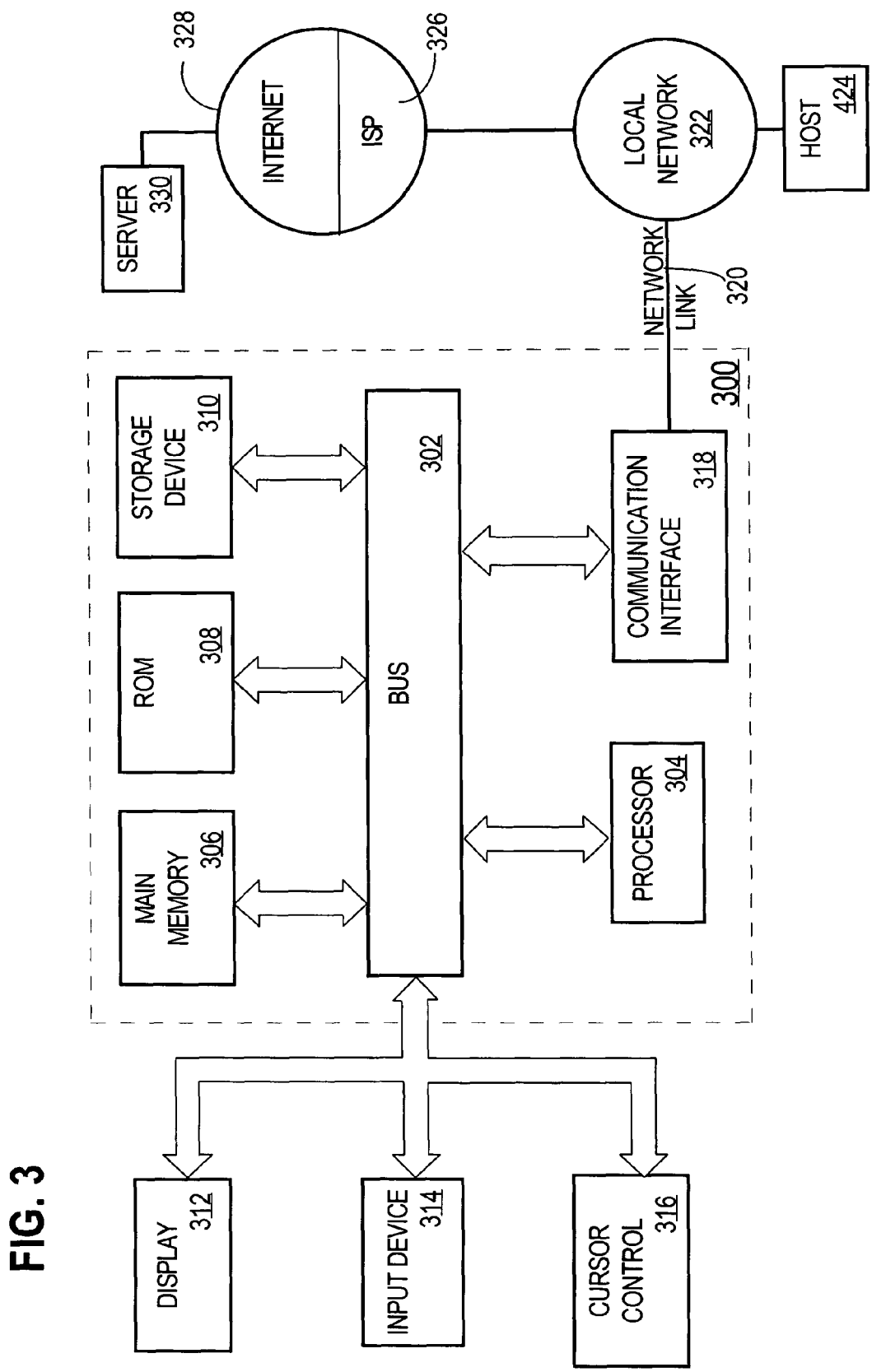
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 402 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for qualifying a client to access a network. According to one embodiment of the invention, qualification methods are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for automated provisioning of phones in packet voice networks as described herein.

Processor 304 may execute the received code as it is received, and/or stored in storage device 310, or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The present invention may be practiced as a method or device adapted to practice the method. The same method can be viewed from the perspective of a system, a policy server, a rules manager or server, an access server that enforces a qualification process, or software resident on a client seeking to gain access to the network.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method of qualifying a client machine to access a network, comprising the computer-implemented steps of:

receiving a request for access from the client machine from an access server through which the client machine must first go to access the network, said request including user identification information;

determining qualification procedures and standards of adequate protection for the client machine based on the user identification information;

sending the determined qualification procedures to the access server;

receiving from the access server results of applying the qualification procedures at the client machine;

determining a level of allowable network access for the client machine based on the results; and instructing the access server to enforce the determined level of allowable network access;

wherein determining the qualification procedures and standards of adequate protection comprises:

determining a role for the client machine based on a prioritized set of attributes including two or more of MAC address of the client machine, subnet through which access is requested, IP address of the client machine, and network traffic information;

updating, based on at least one outside source, information used to construct a plurality of policy rule sets providing different levels of network access requirements; and determining qualification procedures and standards of adequate protection associated with the determined role and the plurality of policy rule sets;

wherein the method is performed by one or more computing devices.

2. The method of claim 1, additionally comprising the computer-implemented step of:

authenticating the user identification information.

3. The method of claim 2, wherein the step of authenticating the user identification information comprises:

sending the user identification information to a credentials authority; and receiving an authentication determination from the credentials authority.

4. The method of claim 1, wherein the step of sending the qualification procedures to the access server comprises sending the qualification procedures to the access server, wherein the access server sends the qualification procedures to the client machine.

5. The method of claim 1, wherein the determined qualification procedures comprise tests to be applied by a client agent resident on the client machine.

6. The method of claim 1, wherein the determined qualification procedures comprise network-based scans to be applied by the access server.

7. The method of claim 1, wherein the determined allowable network access for the client comprises blocking all access to the network.

8. The method of claim 1, wherein the determined allowable network access for the client comprises quarantining the client machine such that the client machine can only access pre-determined safe resources on the network.

9. The method of claim 1, wherein the determined allowable network access for the client comprises allowing the client machine access only to pre-determined remediation resources on the network.

10. The method of claim 9, additionally comprising the step of redirecting the client machine to the pre-determined remediation resources.

11. The method of claim 9, wherein the pre-determined remediation resources comprise a downloadable remediation package that can be installed on the client machine.

12. The method of claim 1, wherein the step of determining qualification procedures and standards of adequate protection for the client comprises:
  determining if the client machine is on a clean list; and
  if the client machine is on the clean list, instructing the access server to allow the client machine to access the network.

13. The method of claim 12, wherein the step of determining if the client machine is on a clean list is based on at least one of user identification information, MAC address of the client machine and IP address of the client machine.

14. A system for qualifying a client machine to access a network, comprising:
  one or more processors;
  a computer-readable storage medium storing one or more sequences of instructions, which when executed cause the one or more processors to provide
  an access manager, said access manager storing a plurality of policy rule sets, each policy rule set containing qualification procedures and associated standards of adequate protection; and
  said access manager determining qualification procedures and standards of adequate protection;
  and to provide at least one access server through which the client machine must first go to access the network;
  wherein the access manager provides one or more policy rule sets to the access server for application upon a request from a client machine to access the network;
  wherein the access server applies the one or more policy rule sets to the client machine and provides results of applying the qualification procedures to the access manager; and
  wherein the access manager determines allowable network access by the client machine based on the results,
  wherein determining qualification procedures and standards of adequate protection comprises:

determining a role for the client machine based on a prioritized set of attributes including two or more of MAC address of the client machine, subnet through which access is requested, IP address of the client machine, and network traffic information;
updating, based on at least one outside source, information used to construct the plurality of policy rule sets;
determining qualification procedures and standards of adequate protection associated with the determined role, and
wherein the plurality of policy rule sets provide different levels of network access requirements.

15. The system of claim 14, additionally comprising:
a second computer-readable medium resident on the client machine and storing one or more sequences of instructions which when executed, cause one or more processors on the client machine to apple at least one of the qualification procedures and send the results to the access server.

16. A method of qualifying a client machine to access a network, comprising the computer-implemented steps of:
  receiving a request for access from the client machine from an access server through which the client machine must first go to access the network, said request including user identification information;
  determining if the client machine is on a clean list;
  causing the user of the client machine to be authenticated;
  determining a role for the user of the client machine based on the authentication results and a prioritized set of attributes including two or more of MAC address of the client machine, subnet through which access is requested, IP address of the client machine, and network traffic information;
  determining qualification procedures and standards of adequate protection for the client machine based on the user identification information;
  if the client machine is determined to be on the clean list, allowing the client machine to access the network according to the determined role;
  sending the determined qualification procedures to the access server;
  in response to determining that the qualification procedures include procedures to be applied by a client agent on the client machine, receiving from the access server first results of applying the qualification procedures by the client agent at the client machine;
  in response to determining that the first results indicate that the client machine does not meet the determined standards of adequacy, downloading a remediation package to the client machine;
  in response to determining that the qualification procedures include procedures to be applied by the access server, receiving from the access server second results of applying the procedures to the client machine;
  in response to determining that the second results indicate that the client machine does not meet the determined standards, redirecting the client machine to remediation resources;
  determining a level of allowable network access for the client machine based on the determined role; and
  instructing the access server to enforce the determined level of allowable network access;
  wherein determining the qualification procedures and standards of adequate protection comprises determining a role for the client machine;

updating, based on at least one outside source, information used to construct a plurality of policy rule sets providing different levels of network access requirements;

determining qualification procedures and standards of adequate protection associated with the determined role and the plurality of policy rule sets;

wherein the method is performed by one or more computing devices.

17. A non-transitory computer-readable storage medium storing one or more sequences of instructions which when executed, cause one or more processors to perform:

receiving a request for access from a client machine from an access server through which the client machine must first go to access a network, said request including user identification information;

determining qualification procedures and standards of adequate protection for the client machine based on the user identification information;

sending the determined qualification procedures to the access server;

receiving from the access server results of applying the qualification procedures at the client machine;

determining a level of allowable network access for the client machine based on the results; and instructing the access server to enforce the determined level of allowable network access;

wherein determining the qualification procedures and standards of adequate protection comprises:

determining a role for the client machine based on a prioritized set of attributes including two or more of MAC address of the client machine, subnet through which access is requested, IP address of the client machine, and network traffic information;

updating, based on at least one outside source, information used to construct a plurality of policy rule sets providing different levels of network access requirements; and determining qualification procedures and standards of adequate protection associated with the determined role and the plurality of policy rule sets.

18. The computer-readable storage medium of claim 17, further comprising instructions which when executed cause the one or more processors to perform authenticating the user identification information.

19. The computer-readable storage medium of claim 18, further comprising instructions which when executed cause the one or more processors to perform sending the user identification information to a credentials authority; receiving an authentication determination from the credentials authority.

20. The computer-readable storage medium of claim 17, further comprising instructions which when executed cause the one or more processors to perform sending the qualification procedures to the access server, wherein the access server sends the qualification procedures to the client machine.

21. The computer-readable storage medium of claim 17, wherein the determined qualification procedures comprise tests to be applied by a client agent resident on the client machine.

22. The computer-readable storage medium of claim 17, wherein the determined qualification procedures comprise network-based scans to be applied by the access server.

23. The computer-readable storage medium of claim 17, wherein the determined allowable network access for the client comprises blocking all access to the network.

24. The computer-readable storage medium of claim 17, wherein the determined allowable network access for the client comprises quarantining the client machine such that the client machine can only access pre-determined safe resources on the network.

25. The computer-readable storage medium of claim 17, wherein the determined allowable network access for the client comprises allowing the client machine access only to pre-determined remediation resources on the network.

26. The computer-readable storage medium of claim 25, further comprising instructions which when executed cause the one or more processors to perform redirecting the client machine to the pre-determined remediation resources.

27. The computer-readable storage medium of claim 25, wherein the pre-determined remediation resources comprise a downloadable remediation package that can be installed on the client machine.

28. The computer-readable storage medium of claim 17, further comprising instructions which when executed cause the one or more processors to perform determining if the client machine is on a clean list; if the client machine is on the clean list, instructing the access server to allow the client machine to access the network.

29. The computer-readable storage medium claim 28, further comprising instructions which when executed cause the one or more processors to perform determining if the client machine is on a clean list based on at least one of user identification information, MAC address of the client machine and IP address of the client machine.

* * * * *

UNITED STATES PATENT AND TRADEMARK OFFICE
CERTIFICATE OF CORRECTION

PATENT NO. : 8,065,712 B1
APPLICATION NO. : 11/138855
DATED : November 22, 2011
INVENTOR(S) : Cheng et al.

Page 1 of 1

It is certified that error appears in the above-identified patent and that said Letters Patent is hereby corrected as shown below:

In the Claims:

Claim 15, column 18, line 17 replace "apple" with --apply--.

Signed and Sealed this
Seventeenth Day of January, 2012

David J. Kappos
*Director of the United States Patent and Trademark Office*